Jan. 3, 1956  H. F. UNGER  2,729,474
SAND SEAL FOR ROTATING BEARING
Filed Dec. 2, 1952

INVENTOR.
HECTOR F. UNGER DECEASED
BY DELORES J. UNGER EXECUTRIX
BY
F. R. Geisler
ATTORNEY United States Patent Office 2,729,474
Patented Jan. 3, 1956

2,729,474

SAND SEAL FOR ROTATING BEARING

Hector F. Unger, deceased, late of Portland, Oreg., by Delores J. Unger, executrix, Portland, Oreg.

Application December 2, 1952, Serial No. 323,550

2 Claims. (Cl. 285—97.9)

This application is a continuation-in-part of the pending application Serial No. 89,420, filed under date of April 25, 1949, now Patent 2,625,411, issued January 13, 1953 and entitled "Sprinkler Rotating Spinner Drive Sand Seal," and the present invention similarly relates in general to rotating bearings on liquid supply lines where sand, grit and similar foreign substances are apt to be carried in the liquid delivered, and relates more particularly to bearings for mounting rotating water sprinklers and rotating sprinkler heads where there is likelihood of some sand or grit being contained in the water passing through the pipe line and which foreign matter, if permitted to enter into the rotating bearing, would result in excessive and more rapid wearing of the bearing.

The object of the present invention is to provide an improved so-called sand seal which will protect such a rotary bearing from the entrance of sand, grit or other foreign and abrasive particles into the bearing itself.

A further object of the invention is to provide a resilient sealing member, which, with the aid of the pressure of the water or other liquid being delivered through the pipe line, will form an effective protecting seal for the bearing.

An additional object is to provide a rotary bearing assembly, suitable particularly for rotating water sprinklers and the like, which assembly will include a dependable sealing member, and which entire assembly will be simple and practical in construction and inexpensive to manufacture.

The manner in which these objects and incidental advantages are attained with the present invention, and the construction and operation of the rotary bearing assembly and special sealing member, will be briefly explained with reference to the accompanying drawings.

Figure 1:
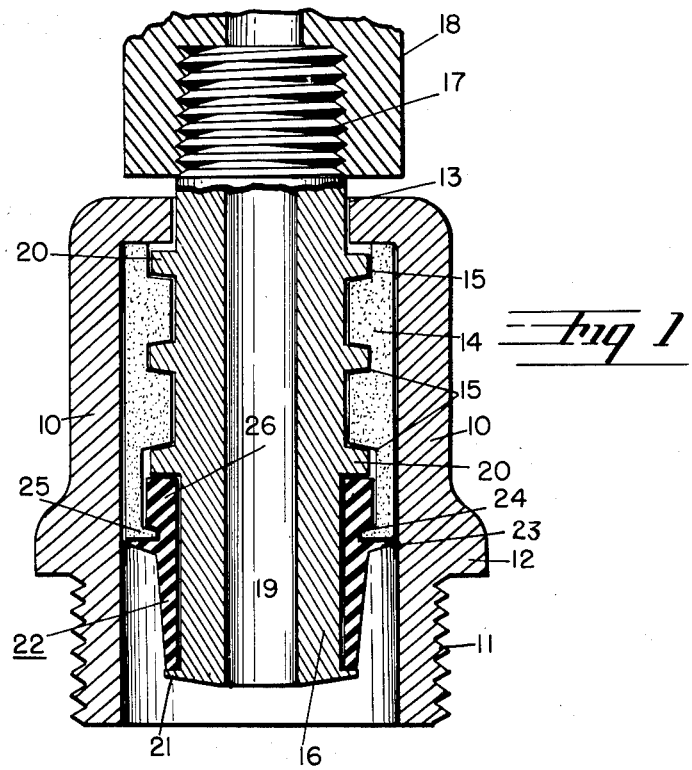
Fig. 1 is a sectional elevation of the rotary bearing assembly taken approximately through the axis of rotation of the rotating shank on which a sprinkler head is adapted to be carried.

Referring first to Fig. 1, the rotating bearing assembly is positioned in a housing 10, which is preferably cylindrical and which is adapted to be secured on the end of the water delivery pipe or water outlet (not shown) by suitable threaded engagement, for which purpose the lower end of the housing 10 is provided with threads on its outer surface as indicated at 11. As a convenience in securing the housing 10 on the delivery pipe connection, the housing is preferably formed with an annular shoulder 12, the periphery of which may be hexagonal or other suitable shape to facilitate the application of a wrench to the housing. The upper or opposite end of the housing is partly closed but has an axial opening 13 large enough to accommodate freely the hollow rotating shank member 16.

Figure 2:
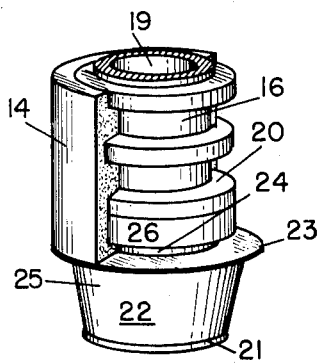
Fig. 2 is a fragmentary perspective view, drawn to a smaller scale, of a portion of the shank and one of the halves of the bearing together with the resilient sealing member.
Figure 3:
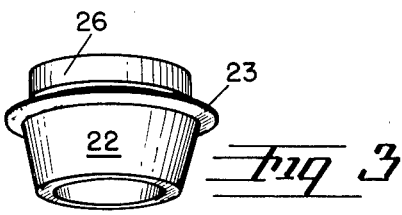
Fig. 3 is a perspective view of the resilient sealing member by itself.

The shank member 16 is rotatably mounted in a bearing or bearing sleeve, indicated in general by the reference character 14, and which preferably comprises two complementary or identical semi-cylindrical portions, one of these portions being shown in Figs. 1 and 2. The outside wall of the rotating shank member 16, within the bearing 14, is formed with a plurality of annular ribs 20 and the inner or bearing face of the bearing 14 is provided with grooves 15 to receive the ribs 20 of the shank member and thus prevent any appreciable movement in an axial direction of the shank member and bearing with respect to each other. The upper or outlet end of the shank member 16 is threaded, as indicated at 17 in Fig. 1, and the base of a sprinkler head, a portion of which is shown at 18, is secured on the top of the shank member and also limits the extent to which the shank member, and with it the bearing 14, can drop down in the housing 10 when the water is turned off and there is no water pressure exerting an upward thrust on the various members of the assembly.

As apparent from Fig. 1, when the sprinkler (not shown) is in operation and the sprinkler head and with it the shank member 16 are rotating, water passes upwardly through the channel 19 of the shank member into the sprinkler head. As is well known, small amounts of sand, grit, or other foreign particles are frequently carried along through water pipe lines with the water supplied for irrigation and sprinkling, and the entry of such particles of grit in between the shank member and its bearing considerably reduces the life of the bearing and similarly causes wear on the shank member and increases the leakage of water up between the bearing and the shank member as the wear increases. In order to prevent this a special sealing member, designated as a whole by the reference character 22, is provided at the lower portion of the shank and bearing.

The lower or intake end of the shank member 16 extends below the corresponding end of the bearing 14 and terminates in an enlarged head or bottom annular flange 21. The special sealing member 22, which is formed of rubber or similar resilient material, is mounted on the lower end of the shank member 16 as shown in Figs. 1 and 2, with the bottom of the sealing member 22 adjacent the annular bottom flange 21. The inner diameter of this sealing member 22 corresponds approximately to the outer diameter of the shank member 16 as shown. The outer diameter of the sealing member 22 at the bottom end does not exceed, and preferably is slightly less than the peripheral diameter of the bottom flange 21.

An essential portion of this sealing member 22 consists of an integral lip 23 which is so located on the sealing member as to be positioned adjacent the bottom end of the bearing 14. This lip 23 is relatively thin and is preferably, though not necessarily, outwardly tapered as illustrated in Fig. 1. In any event the lip is thin enough and flexible enough so that the pressure of the water in the pipe line in and around the bottom end of the shank member will cause the lip 23 to be pressed up against the bottom end of the bearing and thereby act as a seal to prevent the entry of water and foreign particles in between the bearing and the shank member. The greater the pressure of water, the greater would be the tendency normally for such foreign particles to enter into the bearing, but the greater the pressure of the water the more effective will be the seal between the lip 23 and the bearing to prevent such entry of water and foreign particles into the bearing. The periphery of the lip 23 extends out to the wall of the housing 10.

The bearing 14 has an internal annular rib 25 at the bottom end and the sealing member 22 is formed with an internal annular groove 24 to receive the rib 25. The remaining portion 26 of the sealing member is of increased thickness in order to correspond to the depth of the internal annular groove in the bearing 14 above the bottom rib 25. Thus the faces of the sealing member 22 and of the bearing 14, where they oppose each other, are in close conformity, and this results in the maintenance of a secondary seal between the bearing and the sealing member above the primary seal established by the lip 23.

Thus the possibility of any sand, grit or other foreign and abrasive particles being able to pass up into the bearing is reduced to a minimum, and the flexible and resilient sealing member provides an effective multi-seal which accommodates itself to various water pressures and is in itself an inexpensive and easily replaceable member of the rotating bearing assembly.

I claim:

1. In a rotary bearing assembly of the character described a housing adapted to be mounted on a pipe delivering liquid under pressure, a longitudinally split bearing sleeve in said housing, a shank rotatably journaled in said bearing sleeve, a channel extending axially through said shank, cooperating engaging annular shoulders on the outer surface of said shank and on the inner surface of said bearing sleeve, the bottom end of said shank extending below the bottom end of said bearing sleeve, a resilient annular sealing member mounted on the lower end of said shank, an annular lip on said sealing member spaced from the bottom end of said sealing member and positioned adjacent the bottom end of said bearing sleeve, the periphery of said lip corresponding at least to the inner periphery of said housing, whereby pressure of the liquid at the intake end of said shank channel will cause said lip to be pressed against the bottom end of said bearing sleeve and to block the passage of liquid and any foreign particles therein in between said bearing sleeve and said shank, an annular inturned rib on said bottom end of said bearing sleeve, and an annular groove on said sealing member receiving said rib, said rib and said groove providing an additional seal against the passage of liquid and foreign particles in between said bearing sleeve and said shank.

2. In a rotary bearing assembly of the character described, a housing adapted to be mounted on a pipe delivering liquid under pressure, a substantially cylindrical bearing in said housing formed of two complementary semi-cylindrical portions, a shank rotatably journaled in said bearing, a channel extending axially through said shank, cooperating engaging annular shoulders on the outer surface of said shank and on the inner surface of said bearing, the bottom end of said shank extending below the bottom end of said bearing, an annular flange on said end of said shank, a resilient annular sealing member mounted on said shank adjacent said shank flange, an annular lip on said sealing member spaced from the bottom end of said sealing member and positioned adjacent the bottom end of said bearing, the diameter of the periphery of said lip corresponding at least to the outer diameter of said bearing, whereby said sealing member will cover entirely said bottom end of said bearing and whereby pressure of the liquid at the intake end of said shank channel will cause said lip to be pressed against the end of said bearing and to block the passage of liquid and any foreign particles therein in between said bearing and said shank, an annular inturned rib on said end of said bearing, an annular groove on said sealing member receiving said rib, an internal annular groove in said bearing above said rib, and a rib on said sealing member conforming in radial thickness substantially to the depth of said latter mentioned groove, said latter mentioned bearing groove and said sealing member rib, and said sealing member groove and said rib on said bearing, providing additional seals against the passage of liquid and foreign particles in between said bearing and said shank.

References Cited in the file of this patent

UNITED STATES PATENTS

| 1,912,494 | Patterson | June 6, 1933 |
| 2,185,822 | Young | Jan. 2, 1940 |
| 2,554,622 | Jones | May 29, 1951 |
| 2,625,411 | Unger | Jan. 13, 1953 |